（12） United States Patent
Morita

(10) Patent No.: US 7,848,226 B2
(45) Date of Patent: Dec. 7, 2010

(54) COMMUNICATION SYSTEM, SWITCH

(75) Inventor: Satoshi Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 12/078,180

(22) Filed: Mar. 27, 2008

(65) Prior Publication Data

US 2008/0239946 A1 Oct. 2, 2008

(30) Foreign Application Priority Data

Mar. 28, 2007 (JP) ............................. 2007-084913

(51) Int. Cl.
  *H04L 12/26* (2006.01)
(52) U.S. Cl. ..................................... 370/217
(58) Field of Classification Search .......... 370/216–228
See application file for complete search history.

(56) References Cited

U.S. PATENT DOCUMENTS

| 7,197,660 | B1 * | 3/2007 | Liu et al. ........................ 714/4 |
| 7,209,435 | B1 * | 4/2007 | Kuo et al. ..................... 370/219 |
| 2002/0184387 | A1 * | 12/2002 | Yamaya et al. .............. 709/238 |
| 2005/0243713 | A1 * | 11/2005 | Okuda ........................ 370/216 |
| 2006/0092950 | A1 * | 5/2006 | Arregoces et al. ........... 370/396 |
| 2006/0133264 | A1 | 6/2006 | Yamauchi |
| 2007/0008880 | A1 * | 1/2007 | Buchko et al. .............. 370/218 |

FOREIGN PATENT DOCUMENTS

| EP | 1006702 | * | 6/2000 |
| JP | 2003-115856 | | 4/2003 |
| JP | 2003-179619 | | 6/2003 |
| JP | 2003-318933 | | 11/2003 |
| JP | 2006-180214 | | 7/2006 |

OTHER PUBLICATIONS

ZNYX Networks, Network Level Resilience for High Availability (HA) in Ethernet Networks, 38 pages, 2002.*
Li et al, Cisco Hot Standby Router, Protocol (HSRP), RFC 2281, 17 pages, 1998.*
Knight et al, Virtual Router Redundancy Protocol, RFC 2338, 27 pages, 1998.*

* cited by examiner

*Primary Examiner*—Frank Duong
(74) *Attorney, Agent, or Firm*—Staas & Halsey LLP

(57) ABSTRACT

According to an aspect of an embodiment, a communication system comprises: a. a first information processing device; b. a first communication line and a first backup line connected to the first information processing device, respectively; c. a second information processing device; d. a second communication line and second backup line connected to the second information processing device, respectively; e. a first switch comprising: a first port connected to the first communication line; a second port connected to the second backup line; and a controller for performing of: detecting a failure of the first port; switching the second backup line; and sending a notification; and f. a second switch comprising: a third port connected to the first backup line; a fourth port connected to the second communication line; and a controller for performing of: receiving the notification; switching the first backup line and the second communication line.

16 Claims, 13 Drawing Sheets

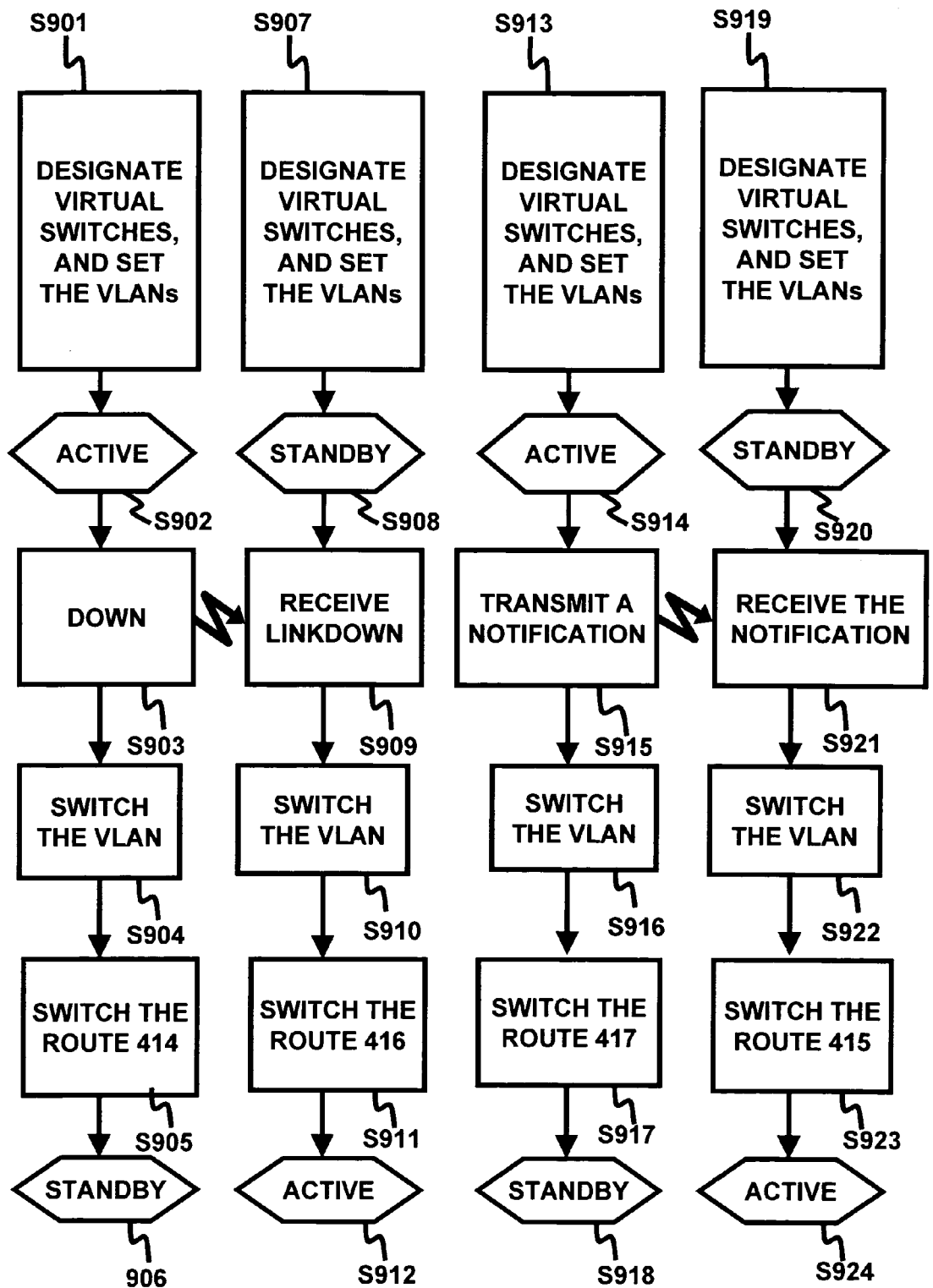

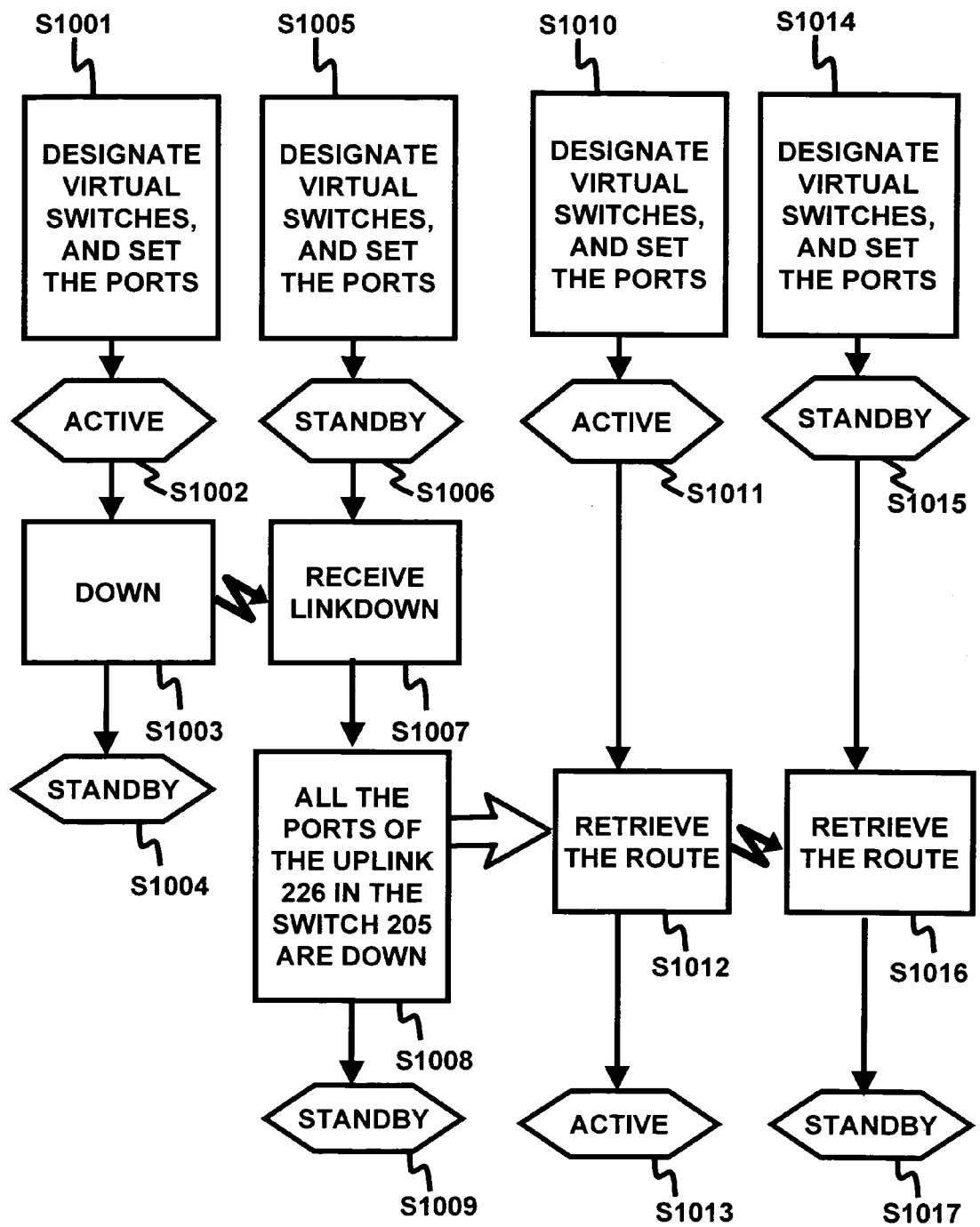

Fig. 11

PHYSICAL ADAPTOR IDENTIFIER 1101

VLAN LINK IDENTIFIER 1102

GROUP INFORMATION 1103

UPLINK GROUP INFORMATION 1104

DOWNLINK GROUP INFORMATION 1105

LINK INFORMATION 1106

LINK-GROUP CORRELATING INFORMATION 1107

GROUP MOVING LINK INFORMATION 1108

MOVING LINK CORRELATING INFORMATION 1109

INFORMATION 1110 OF A MODE FOR INCREASING THE NUMBER OF VLANS

INFORMATION 1111 ON A TARGET GROUP OF THE MODE FOR INCREASING THE NUMBER OF VLANS.

S1100

COMMUNICATION SYSTEM, SWITCH

BACKGROUND OF THE INVENTION

1. Field of the Invention

This art relates to a switching system with a redundant configuration.

2. Description of the Related Art

For the purpose of ensuring communication reliability, a switch such as a router has a redundant configuration. In the actual operation, the router has a redundant configuration using a VRRP (Virtual Router Redundancy Protocol). Further, in order to effectively use resources such as a CPU and a memory in the switch, a switching system has a so-called Active-Active configuration. The Active-Active configuration is obtained by multiplexing a VRID of the VRRP, in which a plurality of routers with the redundant configuration communicate data. Herein, the VRID is an identifier that identifies a group of virtual routers at the VRRP.

However, even if the switching system with the redundant configuration has the Active-Active configuration, upon causing a fault in one switch, there is a problem that the communication load is caused in another switch.

Further, there is the following Japanese Laid-open Patent Publication No. 2003-318933, as a patent document, with respect to the switching system.

SUMMARY

According to an aspect of an embodiment, a communication system comprises: a. a first information processing device; b. a first communication line and a first backup line connected to the first information processing device, respectively; c. a second information processing device; d. a second communication line and second backup line connected to the second information processing device, respectively; e. a first switch comprising: a first port connected to the first communication line; a second port connected to the second backup line; and a controller for performing of: detecting a failure of the first port; switching the second backup line; and sending a notification; and f. a second switch comprising: a third port connected to the first backup line; a fourth port connected to the second communication line; and a controller for performing of: receiving the notification; switching the first backup line and the second communication line.

BRIEF DESCRIPTION OF THE DRAWINGS

FIG. 9 is a diagram showing an operation sequence flow of a mode for increasing the number of VLANs according to the embodiment.

FIG. 10 is a diagram showing a sequence flow for a retrieving function of a DOWNLINK group at a fault timing according to the embodiment.

FIG. 11 is a diagram showing a physical adaptor management table according to the present invention.

DESCRIPTION OF THE PREFERRED EMBODIMENTS

Figure 1:
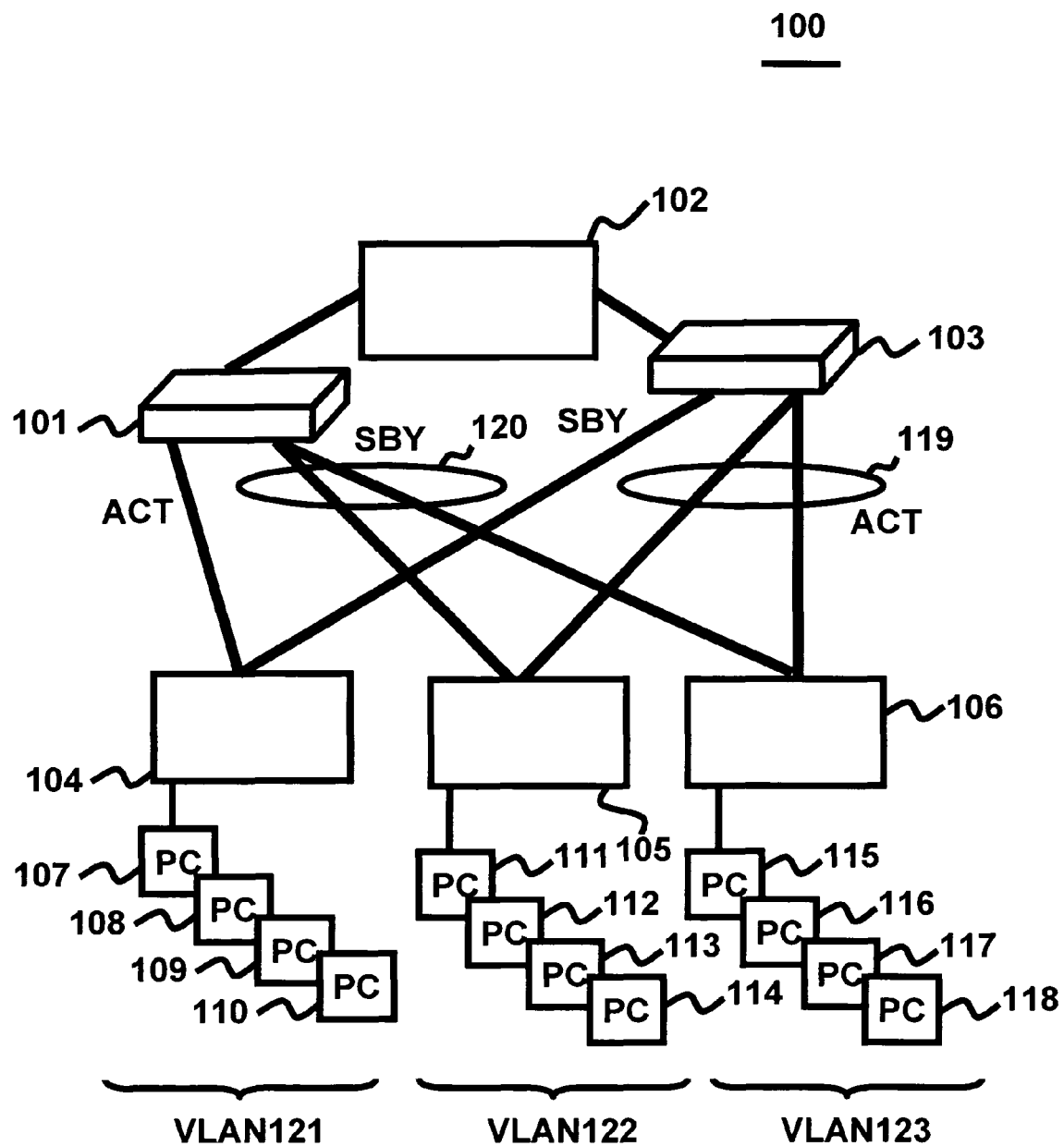
FIG. 1 is a diagram showing the structure of a switching system with a redundant configuration according to the embodiment.

FIG. 1 is a diagram showing the structure of a switching system 100 with a redundant configuration according to an embodiment.

The switching system 100 comprises: switches 101 to 106; and personal computers (PCs) 107 to 118. The personal computers 107 to 110 are connected to the switch 104. Similarly, the personal computers 111 to 114 are connected to the switch 105, and the personal computers 115 to 118 are connected to the switch 106. According to the embodiment, the switches 101 and 103 have the redundant configuration. Further, the redundant configuration of the switches 101 and 103 is the Active-Active configuration using a VRRP. With the Active-Active configuration of the switches 101 and 103 using the VRRP, VLANs that can be individually used by the switches 101 and 103 are partly assigned to virtual switches identified by VRIDs. Furthermore, other virtual switches identified by VRIDs are assigned to other VLANs that can be individually used by the switches 101 and 103. Physically, the switches 101 and 103 operate together with each other by network communication. Herein, the VRRP is a protocol for multiplexing a router. Further, the VRID is an identifier that identifies a group of virtual routers of the VRRP.

Further, for a VLAN (Virtual Local Area Network), a function of network devices such as the switches 101 to 106 structures a virtual network in accordance with an MAC address, an IP address, and a protocol, independently of physical connection, and further groups terminals. Furthermore, according to the embodiment, the terminal means a device, a computer, and software that are dedicated to a user interface (I/F) for operating the computer, including the personal computers 107 to 118.

In addition, the switches 101 and 103 have the Active-Active configuration, thereby effectively using resources such as CPUs and memories of the switches 101 and 103. That is, via a part of the VLANs according to the embodiment, communication is performed via the switch 101, and communication is also performed via the switch 103 via other VLANs. Therefore, the number of VLANs assigned to CPUs and memories of the switches 101 and 103 may be small.

The personal computers 107 to 110 form a VLAN 121. Similarly, the personal computers 111 to 114 form a VLAN 122, and the personal computers 115 to 118 form a VLAN 123.

The VLAN 121 executes communication via the redundant configuration (Active-Standby configuration) of a virtual switch for setting the switch 101 to Active and for setting the switch 103 to Standby. Further, the VLANs 122 and 123 execute the communication via the redundant configuration (Active-Standby configuration) of a virtual switch for setting the switch 101 to Standby and for setting the switch 103 to Active. The VLANs 122 and 123 form groups 119 and 120, and switch the Active-Standby configuration of the switches 101 and 103 on the basis of the unit of the groups 119 and 120. Furthermore, the switches 101 and 103 have a shut-down trigger function. The shut-down trigger function shuts-down even a link port in association with the down-operation of the port when there is a fault in any of monitored ports. According to the embodiment, the link port corresponds to a plurality of ports connected to a plurality of lines forming the group 119 and a plurality of ports connected to a plurality of lines forming the group 120. For example, when a communication fault is caused between the VLAN 123 and the switch 103, the switch 103 shuts-down the port used for communication with the VLAN 122 by using the shut-down trigger function. Upon switching the virtual router of the VRRP, the virtual switch can expand the operation of the VRRP with the down-operation of any of ports as a trigger. In addition, the virtual switch used for communication by the VLAN 121 and the virtual switches used for communication by the VLANs 122 and 123 are identified by the VRIDs, and the switches 101 and 103 identify the virtual switches by using the VRIDs thereof.

Further, the personal computers 115 to 118 are shut-down with the shut-down trigger function of the virtual switch used for communication by the VLAN 122, and the shut-down trigger function of the virtual switch used for communication by the VLAN 123 is set to the down-operation of the personal computers 111 to 114. Thus, if a fault is caused in one virtual switch, another virtual switch is also switched. As a consequence, it is possible to synchronize the Active operation and the Standby operation of the groups 119 and 120.

Figure 2:
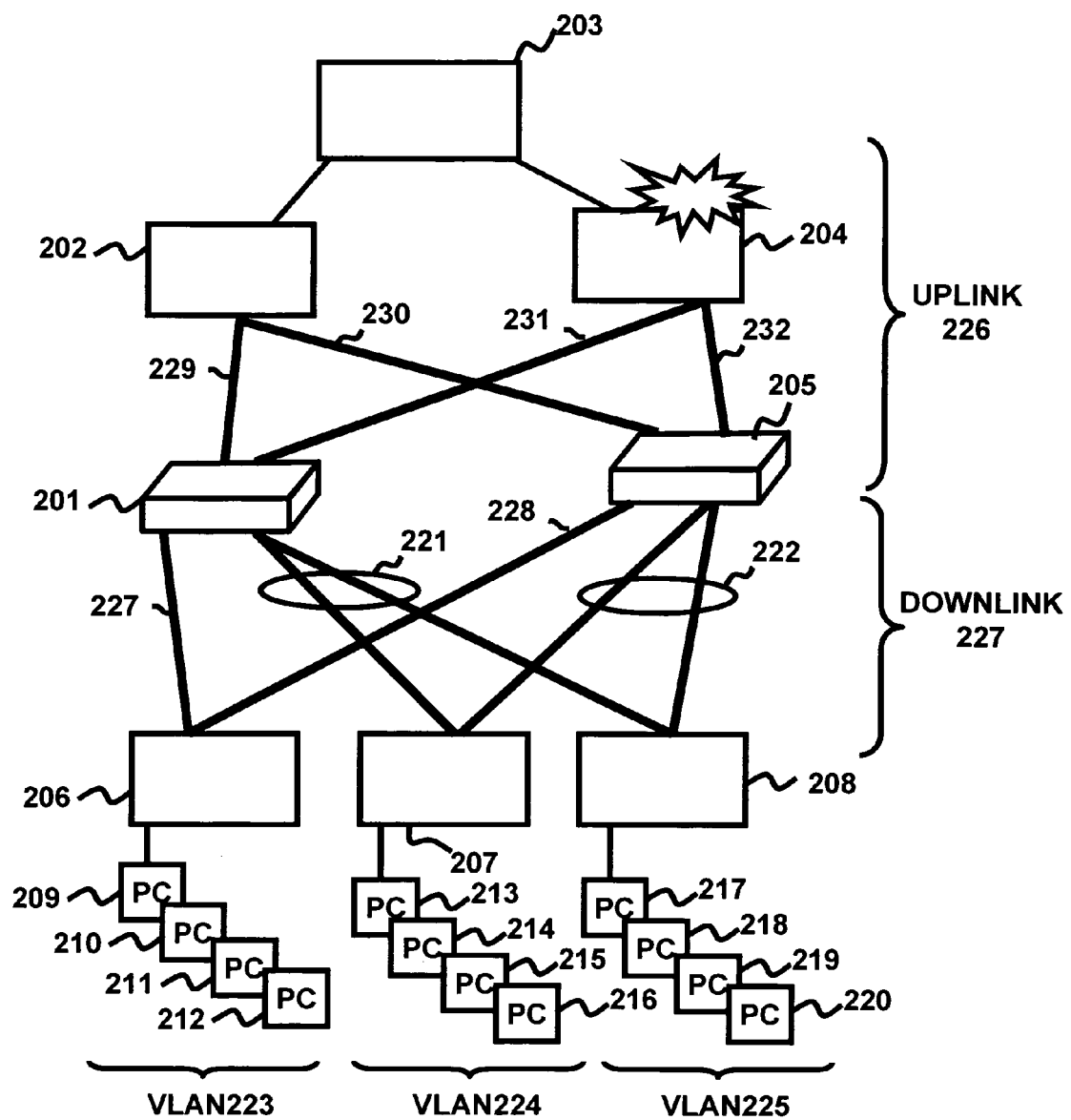
FIG. 2 is a diagram showing the structure of a switching system for simultaneous operation of UPLINK and DOWNLINK according to the embodiment.

FIG. 2 is a diagram showing the structure of a switching system 200 for simultaneous operation of UPLINK and DOWNLINK according to the embodiment.

The switching system 200 comprises: switches 201 to 208; and the personal computers (PCs) 209 to 220. The personal computers 209 to 212 are connected to the switch 206. Similarly, the personal computers 213 to 216 are connected to the switch 207, and the personal computers 217 to 220 are connected to the switch 208. According to the embodiment, the switches 201 and 205 have the redundant configuration. Further, the redundant configurations of the switches 201 and 205 are the Active-Active configurations using the VRRPs. With the Active-Active configuration of the switches 201 and 205 using the VRRP, VLANs that can be individually used by the switches 201 to 205 are partly assigned to virtual routers identified by the VRIDs, and other virtual routers identified by the VRIDs are assigned to other VLANs. As a consequence, with the Active-Active configuration, the switches 201 to 205 are physically operated together with network communication.

For a VLAN 223 according to the embodiment, communication is performed via the switch 201, communication is performed via the switch 205 for VLANs 224 and 225, and the number of VLANs assigned to CPUs and memories of the switches 201 to 205 may be small.

The personal computers 209 to 212 form the VLAN 223. Similarly, the personal computers 213 to 216 form the VLAN 224, and the personal computers 217 to 220 form the VLAN 225.

The VLAN 223 performs communication via the redundant configuration (Active-Standby configuration) of a virtual switch for setting the switch 201 to Active (a route 227 is Active) and for setting the switch 205 to Standby (a route 228 is Standby). Further, the VLANs 224 and 225 perform communication via a redundant configuration (Active-Standby configuration) of a virtual switch for setting the switch 201 to Standby (a route of a group 221 is Standby) and for setting the switch 205 to Active (a route of a group 222 is Active). The redundant configuration of the virtual switches is set to the VLAN 224 and the VLAN 225. Thus, if a fault is caused in one virtual switch, another virtual switch is also switched. Thus, the Active operation and the Standby operation of the groups 119 and 120 can be synchronized.

Subsequently, a network portion comprising the switches 202 and 204 is referred to as an UPLINK 226, and a network portion comprising the switches 201 and 205 is referred to as a DOWNLINK 227. The switches 202 and 204 also have the Active-Active configuration using the VRRP, and form the redundant configuration. A route 229 to the switch 201 with respect to the switch 202 is Active, and a route 230 to the switch 205 with respect to the switch 202 is Standby. Similarly, a route 231 to the switch 201 with respect to the switch 204 is Standby, and a route 232 to the switch 205 with respect to the switch 204 is Active.

With the redundant configuration of the UPLINK 226 and the DOWNLINK 227, the routes used for communication are simultaneously switched. That is, if switching a communication route of the VLAN 223 in the DOWNLINK 227 from the route 227 to the route 228, a communication route in the UPLINK 226 is simultaneously switched from the route 229 to the route 230. Further, if switching communication routes of the VLANs 224 and 225 in the DOWNLINK 227 from routes of the group 222 to routes of the group 221, a communication route in the UPLINK 226 is simultaneously switched from the route 232 to the route 231.

Then, it is assumed that a fault is caused in the network. If the switch 204 is troubled, the VLANs 224 and 225 in the UPLINK perform the communication via the routes 231 and 232 even via any of the switches 201 to 205, thereby disabling the communication. Therefore, according to the embodiment, if the fault is caused in the switch 204, the communication in the UPLINK 226 uses the switch 202 via the routes 229 and 230. That is, the VLANs 224 and 225 switch the routes 231 and 232 in the UPLINK 226 to the routes 229 and 230 similarly to the VLAN 223. At a timing for switching the group of the routes in the UPLINK 226, it is detected that the Standby routes simultaneously operated in the UPLINK 226 are not switched to Active even if switching the route in the DOWNLINK 227. Thus, if causing the fault in a switch such as a switch structuring the network, the communication can continue by the switching operation to the switch having the redundant configuration.

Figure 3:
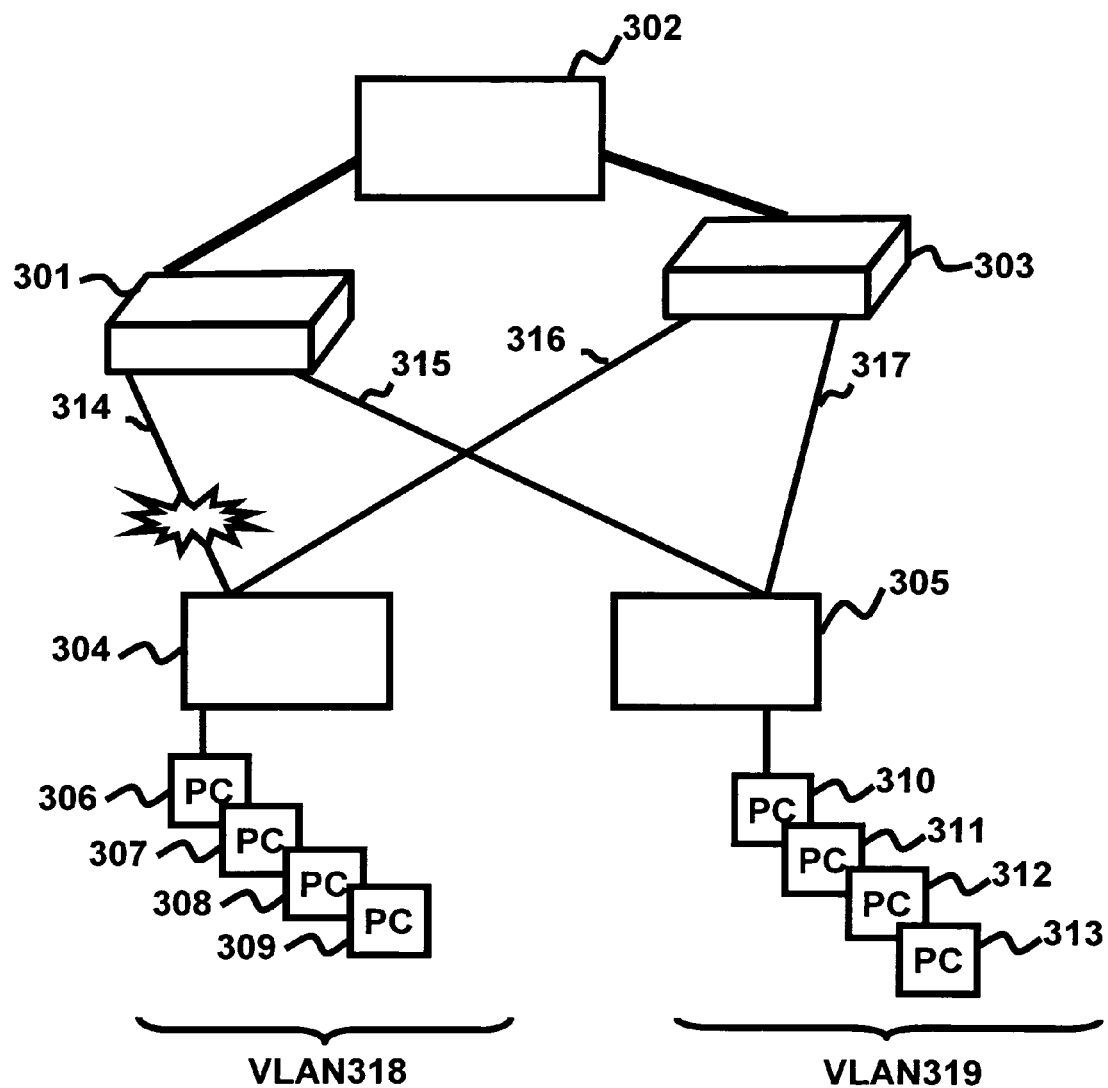
FIG. 3 is a diagram showing the structure of a switching system to prevent the bias of the redundant configuration according to the embodiment.

FIG. 3 is a diagram showing the structure of a switching system 300 that prevents the bias of the redundant configuration that according to the embodiment.

In the switching system 300 according to the embodiment, with the Active-Active redundant configuration, the load upon efficiently using the CPUs and memories of switches 301 and 303 is distributed.

The switching system 300 comprises: the switches 301 and 303 and switches 302, 304, and 305; and personal computers (PCs) 306 to 313. The personal computers 306 to 309 are connected to the switch 304. Similarly, the personal computers 310 to 313 are connected to the switch 305.

According to the embodiment, the switches 301 and 303 have the redundant configuration. Further, the redundant configurations of the switches 301 and 303 are the Active-Active configurations using the VRRPs. The personal computers 306 to 309 form a VLAN 318. Similarly, the personal computers 310 to 313 form a VLAN 319.

The VLAN 318 performs communication via a redundant configuration (Active-Standby configuration) of a virtual switch for setting the switch 301 to Active (a route 314 is Active) and for setting the switch 302 to Standby (a route 316 is Standby). Further, the VLAN 319 performs communication via a redundant configuration (Active-Standby configuration) of a virtual switch for setting the switch 301 to Standby (a route 315 is Standby) and for setting the switch 303 to Active (a route 317 is Active). The virtual switch used for communication by the VLAN 318 and the virtual switch used for communication by the VLAN 319 are identified by using VRIDs, and the switches 301 and 303 identify the virtual switches by using the VRIDs thereof.

Moreover, in the switching system 300 according to the embodiment, the virtual switches used for communication by the VLANs 318 and 319 switch the routes with the simultaneous operation. Thus, the switching system 300 can prevent the bias of the redundant configuration of the switches 301 and 303.

For example, if a fault is caused in the route 314 and a communication route of the VLAN 318 is switched from the route 314 to the route 316, the routes 315 and 317 are simultaneously switched. As a consequence, the switches 301 and 303 can be physically used. Similarly, if the fault is caused in the route 314 and a communication route of the VLAN 318 is switched from the route 314 to the route 316, the routes 315 and 317 are switched.

Figure 13:
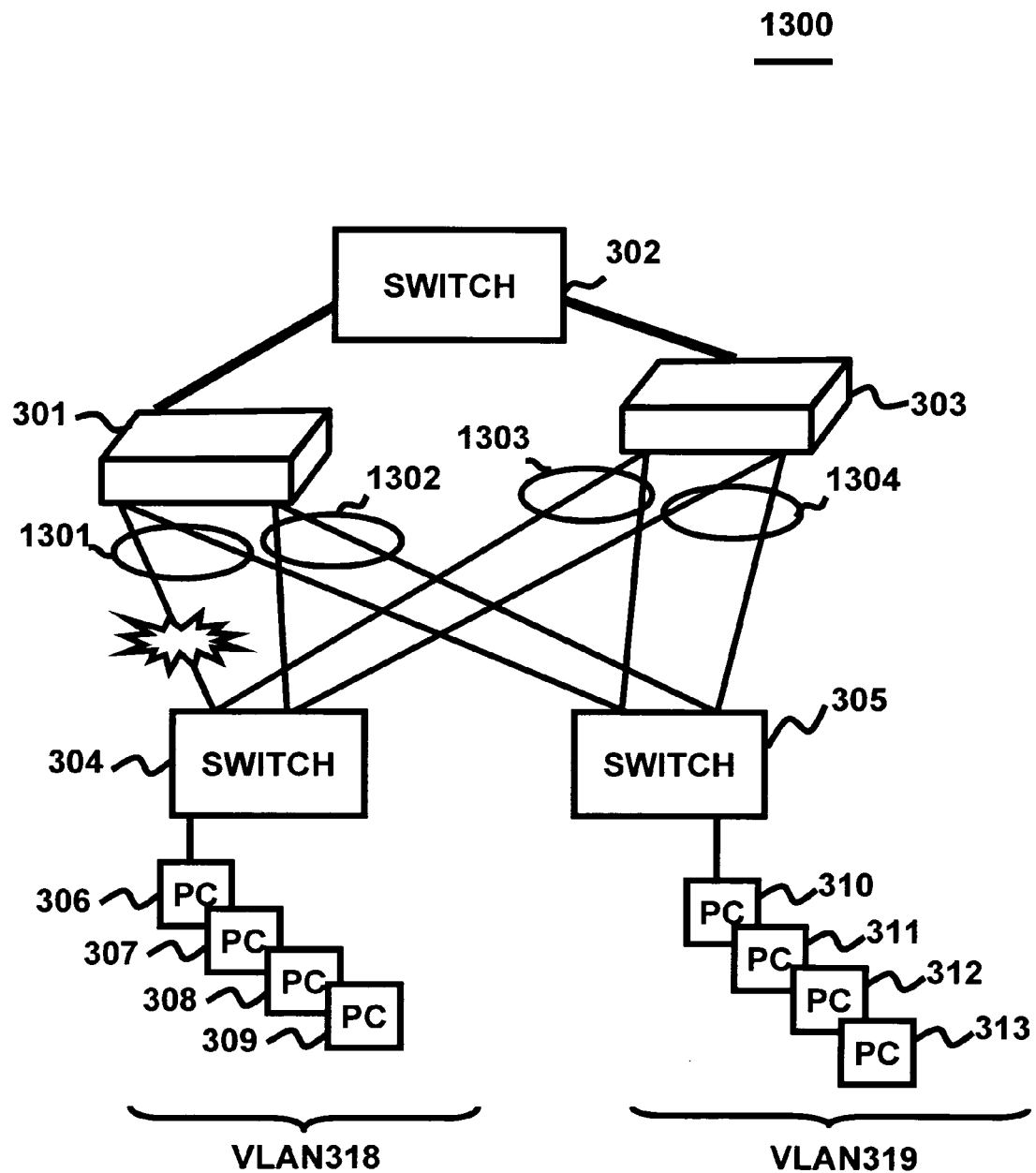
FIG. 13 is a diagram showing the structure of a switching system to prevent the bias of the redundant configuration according to the embodiment.

A description will be given of another switching system 1300 to prevent the bias of the redundant configuration. FIG. 13 is a diagram showing the structure of the switching system 1300 to prevent the bias of the redundant configuration according to the embodiment.

Also in the switching system 1300 according to the embodiment, with the Active-Active redundant configuration, the load upon effectively using resources such as the CPUs and memories of the switches 301 and 303 is distributed.

The switching system 1300 comprises: the switch 301 to 305; and the personal computers (PCs) 306 to 313. The personal computers 306 to 309 are connected to the switch 304. Similarly, the personal computers 310 to 313 are connected to the switch 305.

According to the embodiment, the switches 301 and 303 have the redundant configuration. Further, the redundant configurations of the switches 301 and 303 are the Active-Active configuration using the VRRPs. The personal computers 306 to 309 form the VLAN 318. Similarly, the personal computers 310 to 313 form the VLAN 319.

According to the embodiment, the switch 301 and the switch 303 form a virtual switch for setting a group 1301 to the Active route and for using a group 1303 to the Standby route for communication of a part of the VLAN 318 and a part of the VLAN 319, and a virtual switch for setting a group 1304 to the Active route and for using a group 1302 to the Standby route for communication of a part of the VLAN 318 and a part of the VLAN 319.

Further, in the switching system 1300 according to the embodiment, the virtual switches switch the routes used for communication by the VLAN 318 and the VLAN 319 with simultaneous operation. That is, if one virtual switch switches the Active route and the Standby route, at this switching timing of the routes, the other virtual switch switches the Active route and the Standby route. Thus, the switching system 300 realizes the prevention of the bias of the redundant configuration of the switches 301 and 303.

If a fault is caused in the route belonging to the group 1301, the shut-down trigger function sets all the remaining routes belonging to the group 1301 to the Standby routes. Further, the switch 303 sets the group 1303 to the Active route. Furthermore, the switches 301 and 303 respectively set the groups 1302 and 1304 to the Active route and the Standby route, at this switching timing of the routes in the groups 1301 and 1303. As a consequence, the switches 301 and 303 can be continuously physically used.

Figure 4:
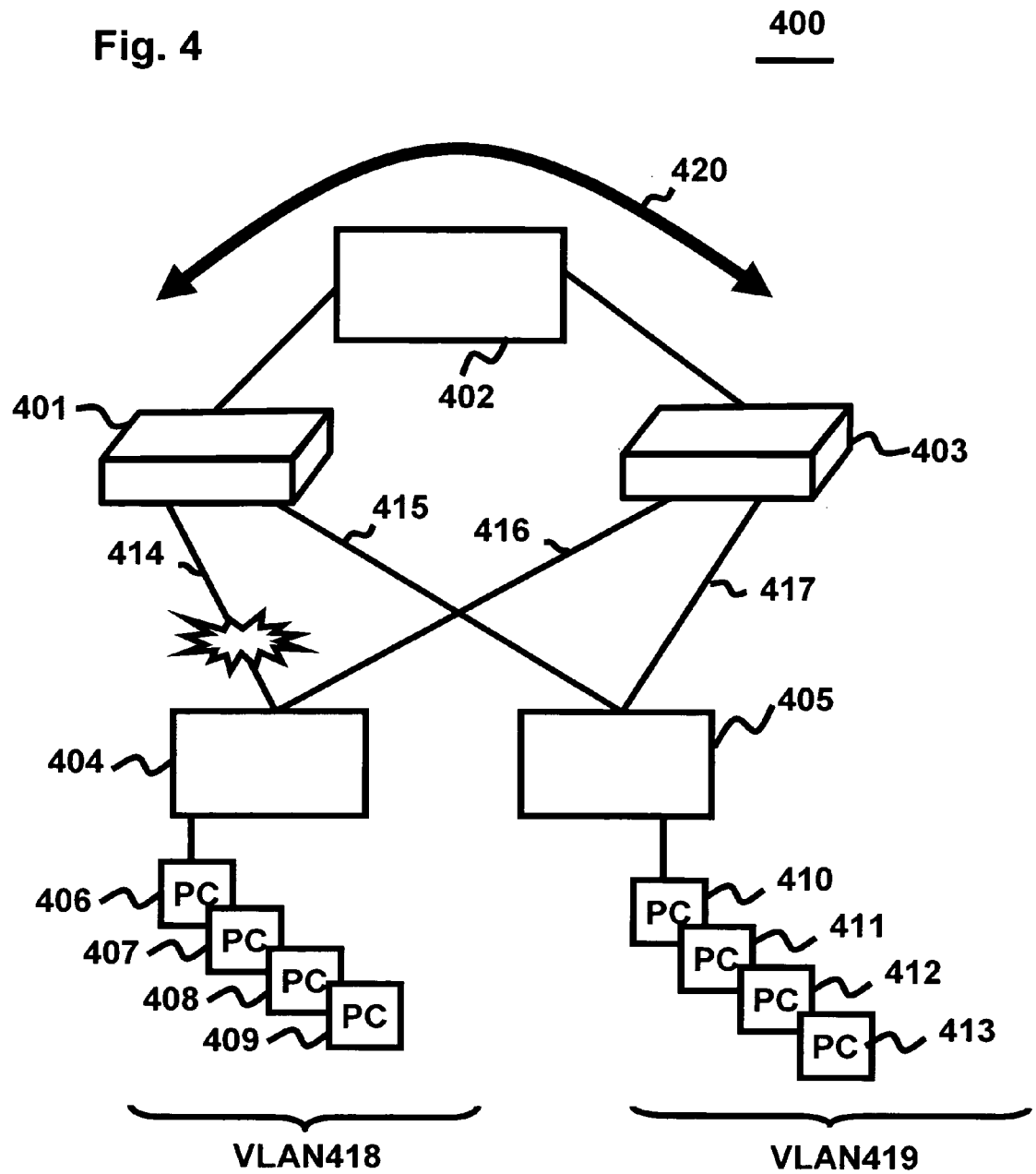
FIG. 4 is a diagram showing the structure of a switching system according to the embodiment.

FIG. 4 is a diagram showing the structure of a switching system 400 according to the embodiment.

Herein, a description will be given of the number of VLANs used by the switching system 400 and a function for increasing the number of authentications corresponding to terminals forming the VLAN. Herein, the number of VLANs indicates the number of VLANs included in the switching system 400, and the number of authentications indicates the number of identifiers corresponding to the terminals forming the VLAN.

The switching system 400 comprises: switches 401 to 405; and personal computers (PCs) 406 to 413. The personal computers 406 to 409 are connected to the switch 404. Similarly, the personal computers 410 to 413 are connected to the switch 405.

According to the embodiment, the switches 401 and 403 have the redundant configuration. Further, the redundant configurations of the switches 401 and 403 have the Active-Active configurations using the VRRPs. The personal computers 406 to 409 form a VLAN 418. Similarly, the personal computers 410 to 413 form a VLAN 419.

The VLAN 418 performs communication via the redundant configuration (Active-Standby configuration) of a virtual switch for setting the switch 401 to Active (a route 414 is Active) and for setting the switch 402 to Standby (a route 416 is Standby). Further, the VLAN 419 performs communication via the redundant configuration (Active-Standby configuration) of a virtual switch for setting the switch 401 to Standby (a route 415 is Standby) and for setting the switch 403 to Active (a route 417 is Active). The virtual switch used for communication by the VLAN 418 and the virtual switch used for communication by the VLAN 419 are identified by VRIDs, and the switches 401 and 403 identify the virtual switches with the VRIDs thereof.

A route via the switch 402 between the switches 401 and 402 can be set as a monitoring path 420 for periodically monitoring the switching operation of communication routes thereof.

Further, if a fault is caused in the route 414 of the VLAN 418, the switches 410 and 403 switch a communication route of the VLAN 418 from the route 414 to the route 416 serving as a Standby route. In other words, the VLAN 418 is assigned to the switch 403. The switches 401 and 403 detect that the communication route used by the VLAN 418 is switched from the route 414 to the route 416 via the monitoring path 420. Further, the switches 410 and 403 switch the communication route of the VLAN 419 from the route 417 to the route 415 serving as the Standby route. In other words, the VLAN 419 is assigned to the switch 401. Accordingly, the switch physically used for communication by the VLAN 418 is the switch 403 and the switch used for communication by the VLAN 419 is the switch 401. Therefore, it is possible to efficiently use resources such as CPUs and memories of the switches 401 and 403. Further, the number of VLANs used by the switching system 400 can be increased with the switching operation of the routes of the switches 401 and 403 and the switching and resetting operation of the VLANs assigned to the switches 401 and 403.

In general, the number of VLANs used by the VRRP is 4,096 at the maximum level. In the actual standard of the switch, the number of VLANs has the upper limit not-more-than 4,096 in many cases, e.g., the maximum number of used VLANs is 60 or 120. Further, according to the embodiment, at the switching timing of the communication routes, the VLAN 418 used by the switch 401 and the VLAN 419 used by the switch 403 are switched. Thus, the switches 401 and 403 can maximally use the number of used VLANs. If the number of VLANs is 4,096 or less and the VLANs are individually assigned to the switches, the number of VLANs used by the switching system can be increased. Further, if requiring 4,096 or more VLANs like wire-area Ethernet (registered trademark), the number of used VLANs is 4,096 or more by adding an identifier to a VLAN ID of one switch in the switching system with the redundant configuration. Furthermore, in the switching system 400 according to the embodiment, the increase in the number of VLANs enables the number of authentications used for identification of the personal computers 406 to 413.

Moreover, according to the embodiment, the ports included in the switch are grouped, thereby forming the virtual switch. In addition, the switching processing performed by the virtual switch is linked by monitoring LINKUP and LINKDOWN in another group of virtual switches with the redundant configuration.

Figure 5:
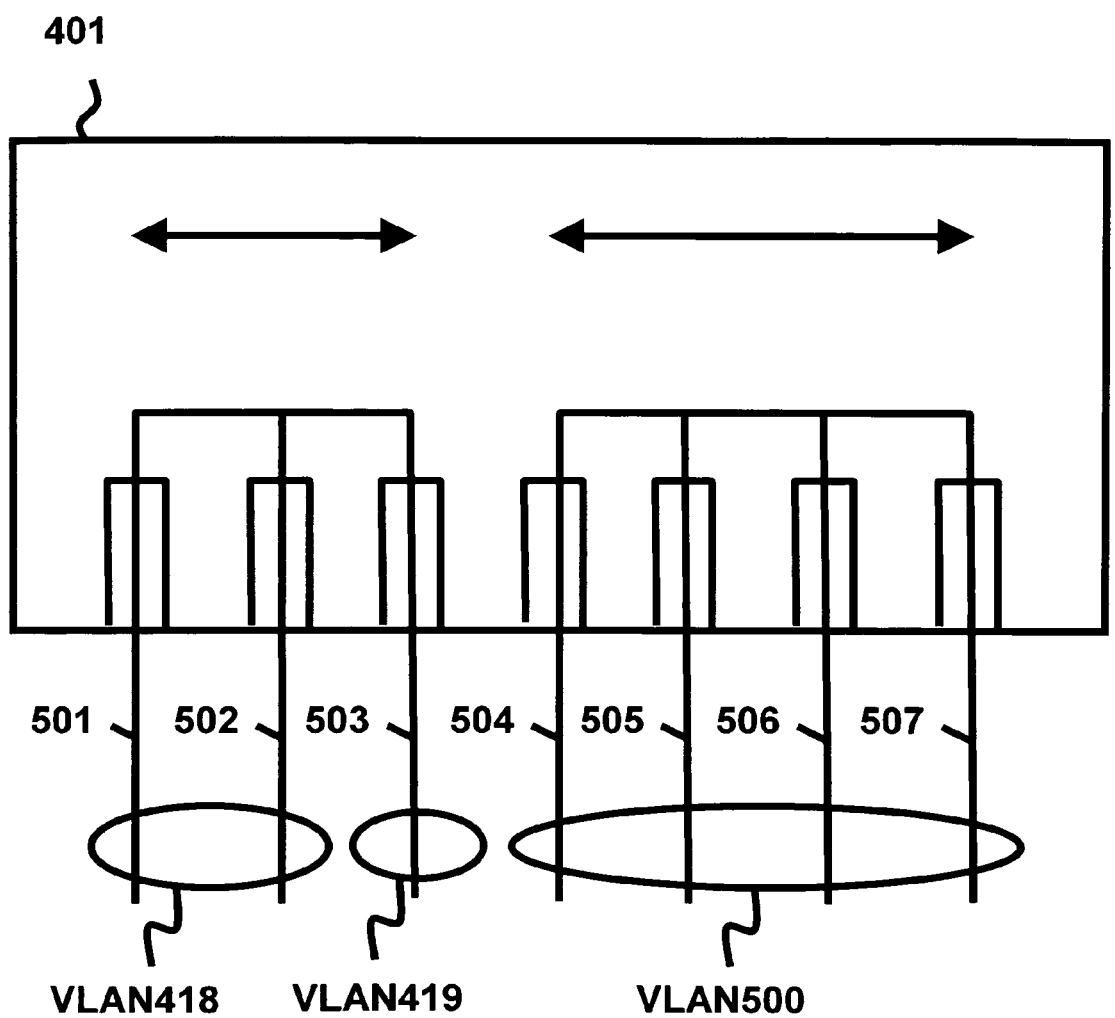
FIG. 5 is a schematic diagram showing grouping of ports included in a switch according to the embodiment.

FIG. 5 is a schematic diagram showing the grouping of the ports included in the switch 401 according to the embodiment.

The switch 401 comprises ports 501 to 507. The ports 501 and 502 are assigned to the VLAN 418, the port 503 is assigned to the VLAN 419, and the ports 501, 505, 506, and 507 are assigned to a VLAN 500. The VLAN 500 is formed by the switch 402 and the switches 401 and 403. The switch 401 groups the ports 501 to 507 corresponding to the individual VLANs 418, 419, and 500. The switch 401 manages group information 1103 of a redundant-configured virtual switch indicating the ports 501 and 502 as a group 51, the port 503 as a group 52, and the ports 504 to 507 as a group 53.

Figure 6:
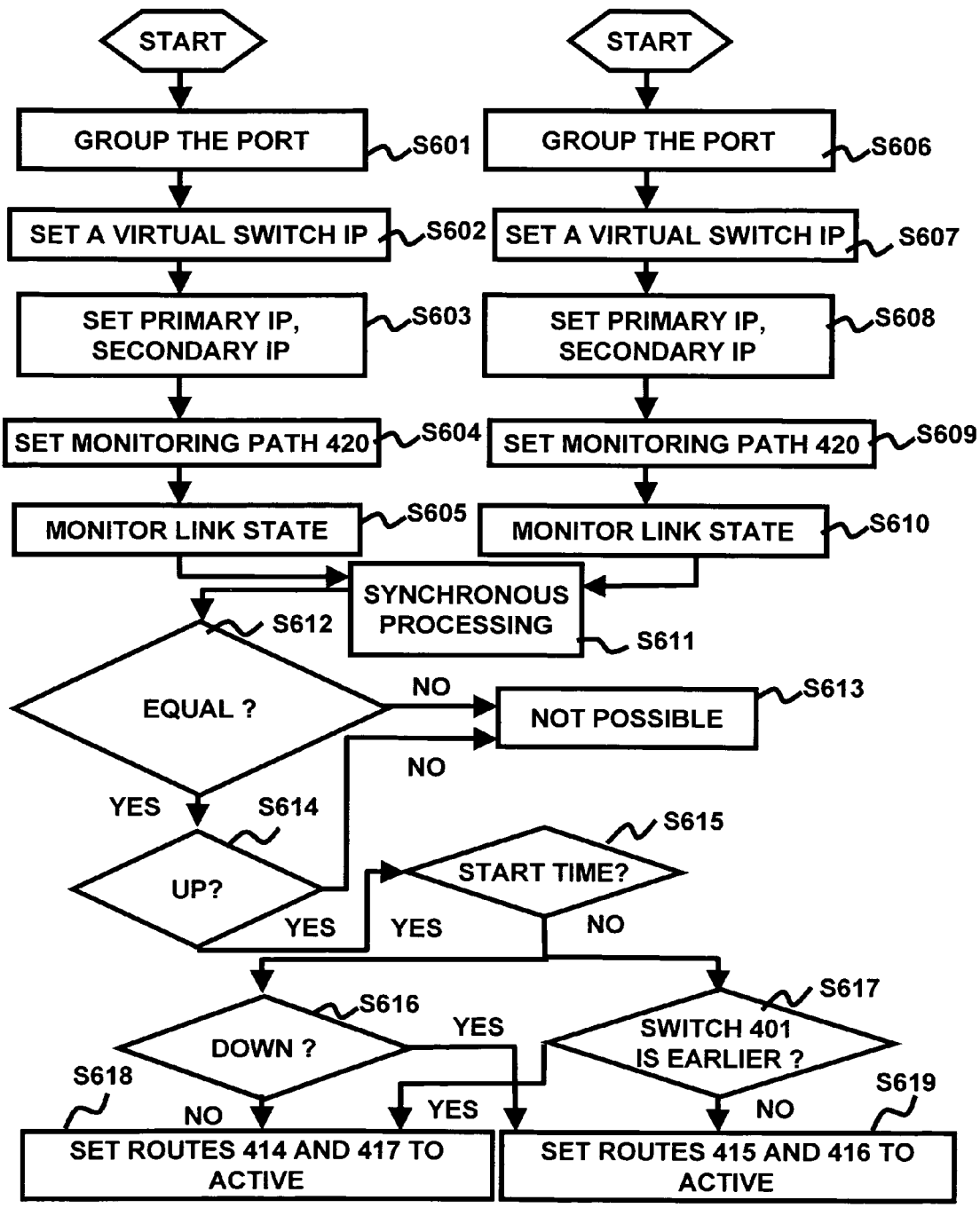
FIG. 6 is a diagram showing a sequence flow for defining the redundant configuration of a virtual switch according to the embodiment.

FIG. 6 is a diagram showing a sequence flow for defining the redundant configuration of the virtual switch according to the embodiment.

With the following sequence, in the switching system 400, it is defined that the Active-Active configurations of the switches 401 and 403 have the redundant configurations.

First, from among the ports included in the switch 401, the switch 401 groups the ports used for communication by the VLAN 418, and adds a group ID to the group (in step S601). The switch 401 sets a virtual switch IP for identifying a virtual switch 61 used for communication by the VLAN 418 (in step S602). According to the embodiment, the virtual switch ID of the virtual switch 61 used for communication by the VLAN 418 and the group ID of the port used for communication by the VLAN 418 have a one-to-one corresponding relationship. However, the virtual switch 61 can use a plurality of groups. In other words, a plurality of the group IDs can correspond to the virtual switch IP. A Primary IP and a Secondary IP for identifying the Active route 414 and the Standby route 416 of the virtual switch 61 used for communication by the VLAN 418 are set (in step S603). The Primary IP indicates the Active route 414 and the Secondary IP denotes the Standby route 416. Further, the switch 401 sets the monitoring path 420 that monitors the switching operation of the communication route of the virtual switch 62 used for communication by the VLAN 419 (in step S604). Subsequently, the switch 401 monitors the switching operation of the route in the virtual switch 62 and the link state of the virtual switch 61 and the virtual switch 62 via the set monitoring path 420 (in step S605).

Similarly, the switch 403 groups the ports used for communication by the VLAN 419 from among the ports included in the switch 403, and adds the group ID to the group (in step S606). The switch 403 sets the virtual switch IP for identifying the virtual switch 62 used for communication by the VLAN 419 (in step S607). According to the embodiment, the virtual switch ID of the virtual switch 62 used for communication by the VLAN 419 and the group ID of the port used for communication by the VLAN 419 have a one-to-one corresponding relationship. However, the virtual switch 62 can use a plurality of groups. In other words, a plurality of the group IDs can correspond to the virtual switch IP. A Primary IP and a Secondary IP for identifying the Active route 417 and the Standby route 415 of the virtual switch 62 used for communication by the VLAN 419 are set (in step S608). The Primary IP denotes the Active route 417 and the Secondary IP denotes the Standby route 415. Further, the switch 403 sets the monitoring path 420 that monitors the switching operation of the communication route of the virtual switch 62 used for communication by the VLAN 403 (in step S609). Subsequently, the switch 401 monitors the switching operation of the route in the virtual switch 62 and the link state of the virtual switch 61 and the virtual switch 62 via the set monitoring path 420 (in step S610).

Subsequently, the virtual switches 61 and 62 start synchronous processing (in step S611). In the synchronous processing, the switches 401 and 403 form the virtual switches 61 and 62 and communicate data between the VLANs 418 and 419 via the monitoring path 420 while monitoring the switching operation of the VLANs 418 and 419.

Subsequently, the switches 401 and 403 determine whether or not the number of the group IDs assigned to the virtual switch 61 by the switch 401 is equal to the number of the group IDs assigned to the virtual switch 62 by the switch 403, and whether or not the number of ports assigned to the virtual switch 61 by the switch 401 is equal to the number of ports assigned to the virtual switch 62 by the switch 403 (in step S612). If it is determined that at least one of the number of the group IDs and the number of ports therebetween does not match each other, it is determined that the redundant configuration is not possible (in step S613).

If it is determined that both of the number of the group IDs and the number of ports therebetween individually match those, the switches 401 and 403 determine whether or not the link state of the ports assigned to the monitoring path 420 by the switches 401 and 403 is UP (in step S614). The UP-link state means that the switches 401 and 403 can monitor themselves each other via the monitoring path 420. If the switches 401 and 403 determine that the link state of the ports assigned to the monitoring path 420 is not UP (is i.e., DOWN), it is determined that the redundant configuration is not possible (in step S613).

When the switches 401 and 403 determine that the link state of the ports assigned to the monitoring path 420 is UP, it is determined whether or not the switches 401 and 403 are at the start time (in step S615).

When it is determined that the switches 401 and 403 are at the start time, it is determined whether or not the Active routes 414 and 417 are DOWN (in step S616). When it is determined that the switches 401 and 403 are not DOWN, the routes 414 and 417 are set to Active and the routes 415 and 416 are set to Standby (in step S618). When it is determined that the switches 401 and 403 are DOWN, the routes 414 and 417 are set to Standby and the routes 415 and 416 are set to Active (in step S619).

When it is determined that the switches 401 and 403 are not at the start time, it is determined whether or not the end of the start operation of the switch 401 is earlier than the end of the start operation of the switch 403 (in step S617).

When the switches 401 and 403 determine that the end of the start operation of the switch 401 is earlier than the end of the start operation of the switch 403, the routes 414 and 417 are set to Active and the routes 415 and 416 are set to Standby (in step S618). When the switches 401 and 403 determine that the end of the start operation of the switch 403 is earlier than the end of the start operation of the switch 401, the routes 414 and 417 are set to Standby and the routes 415 and 416 are set to Active (in step S619).

Figure 7:
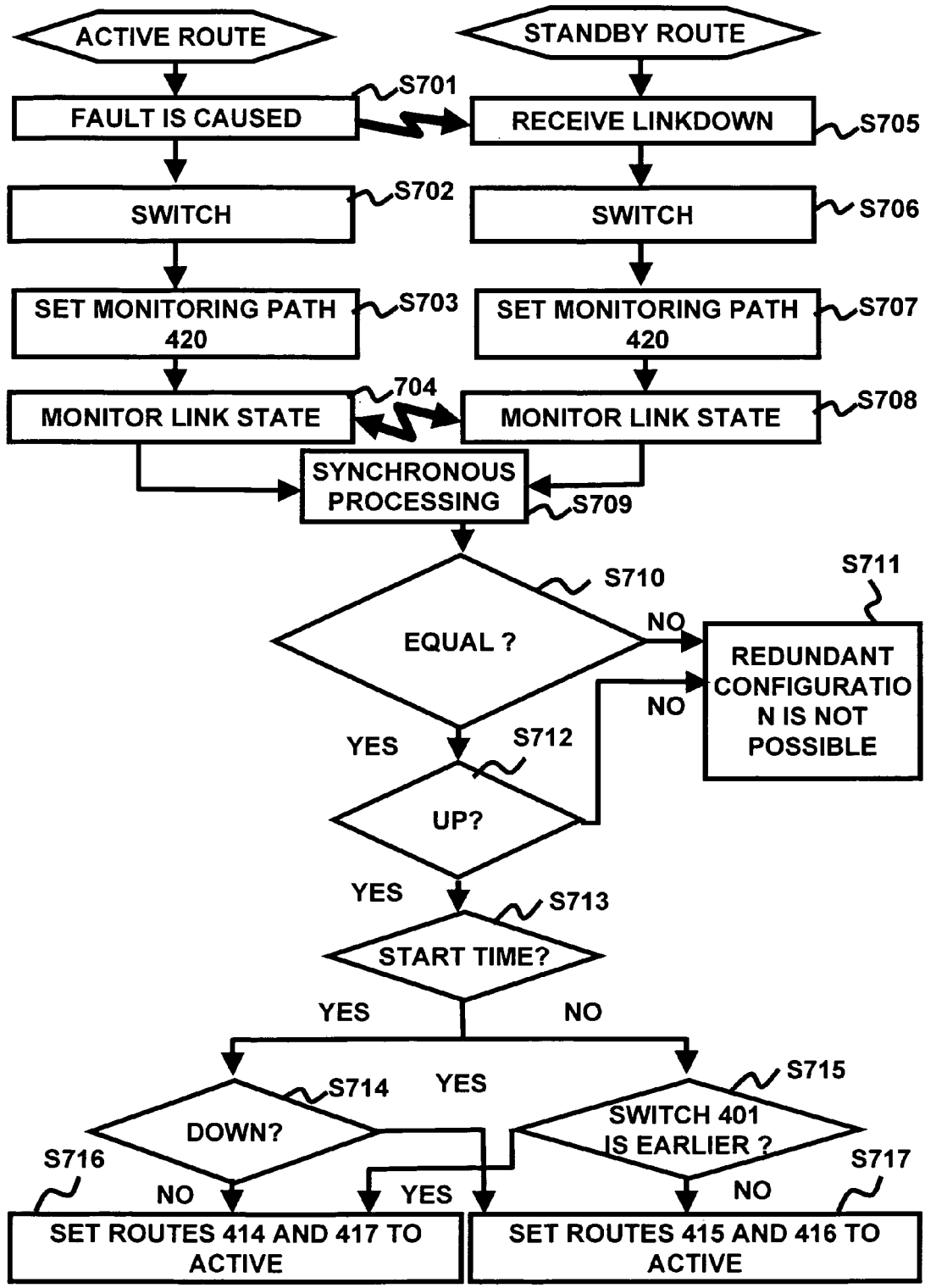
FIG. 7 is a diagram showing a sequence flow for switching a route according to the embodiment.

FIG. 7 is a diagram showing a sequence flow for switching the route according to the embodiment.

In the diagram of the sequence flow, when a fault is caused in any of the Active routes 414 and 417, the routes in the switches 401 and 403 are switched. Hereinbelow, a description will be given of the processing for switching the route when a fault is caused in the Active route 414.

The fault is caused in any of the ports used for the Active route 414 (in step S701). The switch 401 performs processing for switching the route 414 to Standby (in step S702). The switch 401 sets the monitoring path 420 for monitoring the switching operation of the communication route of the virtual switch 62 used for communication by the VLAN 419 (in step S703). The switch 401 switches the route of the virtual switch 62, and monitors the link state between the virtual switches 61 and 62 via the set monitoring path 420 (in step S704). Further, when the monitoring path 420 has been already set or when the set monitoring path is normal, the switches 401 and 403 do not set the monitoring path 420 again.

The switch 403 receives link-down information indicating that the fault is caused in any of the ports used for the Active route 414 from the switch 401 (in step S705). When the monitoring path 420 is normal, the switches 401 and 403 receive and transmit the link-down information by using the monitoring path 420. When the monitoring path 420 does not exist or is DOWN, the switches 401 and 403 receive and transmit the link-down information by using the routes 415 and 417. The switch 403 performs processing for switching the route 416 to Active (in step S706). The switch 403 sets the monitoring path 420 for monitoring the switching operation of the communication route of the virtual switch 62 used for communication by the VLAN 418 (in step S707). The switch 403 switches the route of the virtual switch 61, and monitors the link state between the virtual switches 61 and 62 via the set monitoring path 420 (in step S708).

Further, the virtual switches 61 and 62 start the synchronous processing (in step S709). In the synchronous processing, the switches 401 and 403 form the virtual switches 61 and 62 and communicate data between the VLANs 418 and 419 via the monitoring path 420 while monitoring the switching operation of the communication route thereof.

Furthermore, the switches 401 and 403 determine whether or not the number of the group IDs assigned to the virtual switch 61 by the switch 401 is equal to the number of the group IDs assigned to the virtual switch 62 by the switch 403, and whether or not the number of ports assigned to the virtual switch 61 by the switch 401 is equal to the number of ports assigned to the virtual switch 62 by the switch 403 (in step S710). When at least one of the number of the group IDs and the number of ports does not match each other, it is determined that the redundant configuration is not possible (in step S711).

When both the number of the group IDs and the number of the ports individually match those, the switches 401 and 403 determine whether or not the link state of the ports assigned to the monitoring path 420 by the switches 401 and 403 is UP (in step S712). In the UP-link state, the switches 401 and 403 can monitor each other via the monitoring path 420. When it is determined that the link state of the ports assigned to the monitoring path 420 by the switches 401 and 403 is not UP (i.e., is DOWN), it is determined that the redundant configuration is not possible (in step S711).

When it is determined that the link state of the ports assigned to the monitoring path 420 by the switches 401 and 403 is UP, it is determined whether or not the switches 401 and 403 are at the start time (in step S713).

When it is determined that the switches 401 and 403 are at the start time, it is determined whether or not the Active routes 414 and 417 are DOWN (in step S714). When it is determined that the switches 401 and 403 are not DOWN, the routes 414 and 417 are set to Active and the routes 415 and 416 are set to Standby (in step S716). When it is determined that the switches 401 and 403 are DOWN, the routes 414 and 417 are set to Standby and the routes 415 and 416 are set to Active (in step S717).

When it is determined that the switches 401 and 403 are not at the start time, it is determined whether or not the end of the start operation of the switch 401 is earlier than the end of the start operation of the switch 403 (in step S715).

When the switches 401 and 403 determine that the end of the start operation of the switch 401 is earlier than the end of the start operation of the switch 403, the routes 414 and 417 are set to Active and the routes 415 and 416 are set to Standby (in step S716). When the switches 401 and 403 determine that the end of the start operation of the switch 403 is earlier than the end of the start operation of the switch 401, the routes 414 and 417 are set to Standby and the routes 415 and 416 are set to Active (in step S717).

Figure 8:
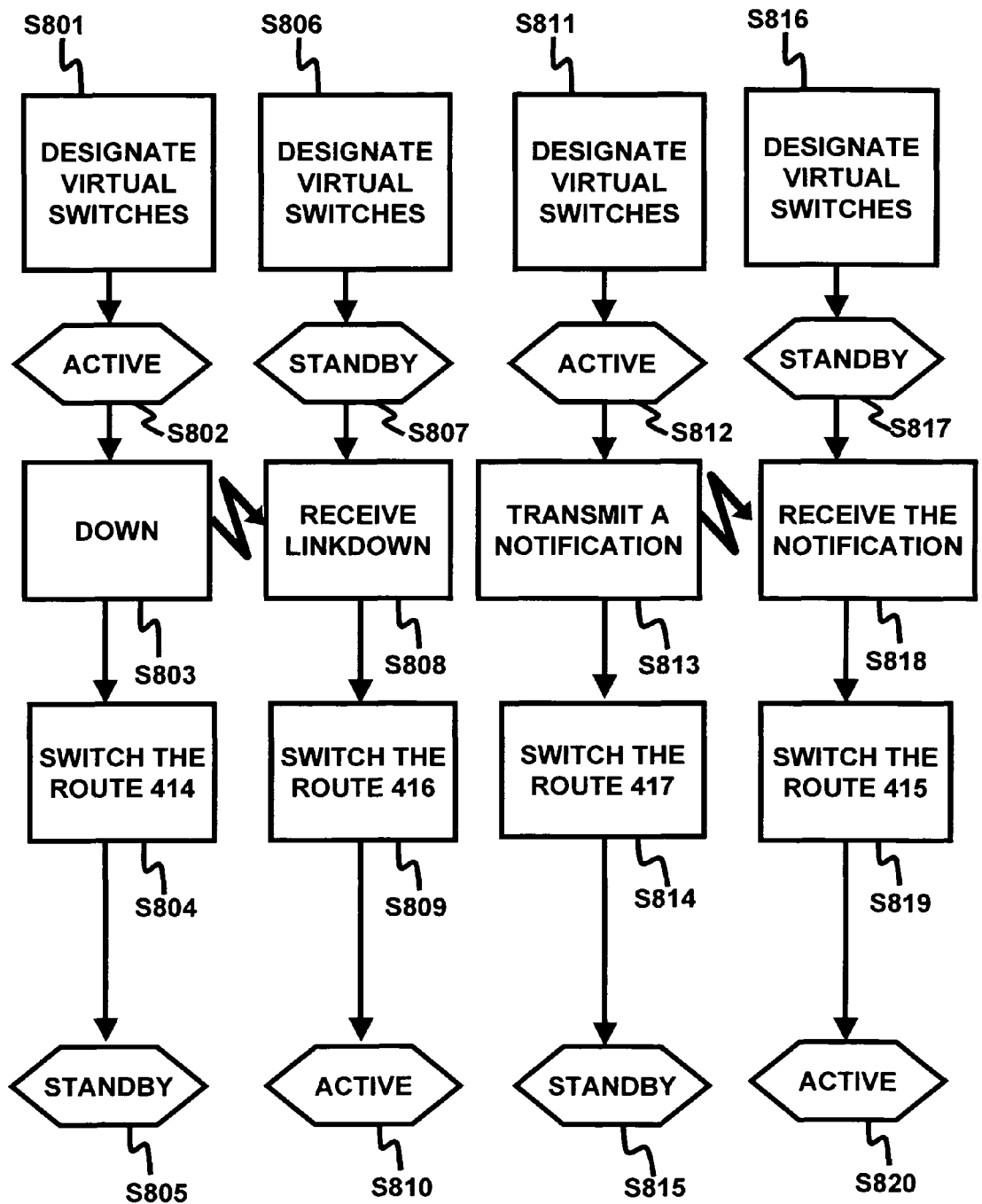
FIG. 8 is a diagram showing a sequence flow for linking operation of the virtual switch according to the embodiment.

FIG. 8 is a diagram showing a sequence flow of the link operation of the virtual switch according to the embodiment.

First, the switches 401 and 403 designate the virtual switches that are switched with the link operation (in steps S801, S806, S811, and S816). Herein, the virtual switches are the virtual switch 61 comprising the routes 414 and 416 and the virtual switch 62 comprising the routes 415 and 417.

Further, the switch 401 sets the route 414 to the Active route of the virtual switch 61 (in step S802). Further, the switch 403 sets the route 416 to the Standby route of the virtual switch 61 (in step S807). Similarly, the switch 401 sets the route 415 to the Active route of the virtual switch 62 (in step S812), and the switch 403 sets to the route 417 to the Standby route of the virtual switch 62 (in step S817).

Further, any of the ports in the switch 401 connected to the route 414 is DOWN (in step S803). The virtual switch 61 performs switching processing for switching the route 414 to the Standby route (in step S804), and the route 414 becomes the Standby route (in step S805).

Further, the switch 403 receives link-down information indicating that any of the ports in the switch 401 connected to the route 414 is DOWN (in step S808). Furthermore, the virtual switch 61 performs switching processing for switching the route 416 to the Active route (in step S809), and the route 416 becomes the Active route (in step S810).

Further, the switch 403 receives an instruction for switching the link operation via the monitoring path 420, and transmits a notification indicating that the route 417 is switched to the Standby route to the switch 401 (in step S813). The virtual switch 62 performs switching processing for switching the route 417 to the Standby route (in step S814), and the route 417 becomes the Standby route (in step S815).

Further, the switch 401 receives the switching notification indicating that the route 417 is switched to Standby from the switch 403 (in step S818). Furthermore, the virtual switch 62 performs switching processing for switching the route 415 to the Active route (in step S819), and the route 415 becomes the Active route (in step S820).

FIG. 9 is a diagram showing an operation sequence of a mode for increasing the number of VLANs according to the embodiment.

First, the switches 401 and 403 designate the virtual switches that are switched with the link operation, and set the VLANs using the virtual switches thereof (in steps S901, S907, S913, and S919). The virtual switches are the virtual switch 61 comprising the routes 414 and 416 and the virtual switch 62 comprising the routes 415 and 417. The VLAN 418 performs communication via the virtual switch 61, and the VLAN 419 performs communication via the virtual switch 62.

Further, the switch 401 sets the route 414 to the Active route of the virtual switch 61 (in step S902). Furthermore, the switch 403 sets the route 416 to the Standby route of the virtual switch 61 (in step S908). Similarly, the switch 401 sets the route 415 to the Active route of the virtual switch 62 (in step S914), and the switch 403 sets the route 417 to the Standby route of the virtual switch 62 (in step S920).

Further, any of the ports of the switch 401 connected to the route 414 is DOWN (in step S903). The switch 401 switches the VLAN to be used from the VLAN 418 to the VLAN 419 (in step S904). The virtual switch 61 performs switching processing for switching the route 414 to the Standby route (in step S905), and the route 414 becomes the Standby route (in step S906).

Further, the switch 403 receives link-down information indicating that any of the ports of the switch 401 connected to the route 414 is DOWN (in step S909). The switch 403 sets the VLAN to be used from the VLAN 419 to the VLAN 418 (in step S910). Furthermore, the virtual switch 61 performs switching processing for switching the route 416 to the Active route (in step S911), and the route 416 becomes the Active route (in step S912).

In addition, the switch 403 receives a switching instruction of the link operation via the monitoring path 420, and transmits, to the switch 401, a notification indicating that the route 417 is switched to the Standby route (in step S915). The switch 403 switches the VLAN to be used from the VLAN 419 to the VLAN 418 (in step S916). The virtual switch 62 performs switching processing for switching the route 417 to the Standby route (in step S917), and the route 417 becomes the Standby route (in step S918).

Further, the switch 401 receives a switching notification indicating that the route 417 is switched to Standby from the switch 403 (in step S921). The switch 401 switches the VLAN to be used from the VLAN 418 to the VLAN 419 (in step S922). Furthermore, the virtual switch 62 performs switching processing for switching the route 415 to the Active route (in step S923), and the route 415 becomes the Active route (in step S924).

FIG. 10 is a diagram showing a sequence flow for a retrieving function of a DOWNLINK group at the time of a fault according to the embodiment.

According to the embodiment, a description will be given of the diagram of the sequence flow by using the switching system 200 shown in FIG. 2 as an example.

First, the switches 201 and 205 designate the virtual switches that are switched with the link operation, and set the ports connected to the UPLINK 226 and DOWNLINK 227 (in steps S1001, S1005, S1010, and S1014). Herein, the virtual switches are the virtual switch 1 comprising the paths 227 and 228 and the virtual switch 2 comprising the groups 221 and 222.

In addition, the switch 205 sets the route belonging to the group 222 to the Active route of the virtual switch 2 (in step S1002), and the switch 201 sets the route belonging to the group 221 to the Standby route of the virtual switch 2 (in step S1006). Similarly, the switch 201 sets the route 227 to the Active route of the virtual switch 1 (in step S1011), and the switch 205 sets the route 228 to the Standby route of the virtual switch 1 (in step S1015).

Then, any of the ports of the switch 205 is DOWN (in step S1003). The virtual switch 2 performs switching processing for switching the route belonging to the group 222 to the Standby route, and the route belonging to the group 222 becomes the Standby route (in step S1004).

Further, the switch 201 receives link-down information indicating that any of the ports of the switch 205 is DOWN (in step S1007). A fault is caused in the switch 204 and the switch 205 determines that all the ports of the UPLINK 226 in the switch 205 are DOWN (in step S1008). The virtual switch 2 continuously sets the route belonging to the group 221 to the Standby route (in step S1009).

Furthermore, the virtual switch 1 performs retrieving processing for retrieving the route belonging to the group 222 of the virtual switch 2 and the route 232 (in step S1012). In addition, the virtual switch 1 continuously sets the route 227 to the Active route (in step S1013). Similarly to the Standby route of the virtual switch 2, the virtual switch 1 performs retrieving processing for retrieving the route belonging to the group 221 of the virtual switch 2 and the route 231 (in step S1016). In addition, the virtual switch 1 continuously sets the route 228 to the Standby route (in step S1017).

FIG. 11 is a physical adaptor management table 1100.

The physical adaptor management table 1100 comprises: a physical adaptor identifier 1101; a VLAN link identifier 1102; the group information 1103 of the redundant-configured virtual switch; UPLINK group information 1104; DOWNLINK group information 1105; link information 1106; link-group correlating information 1107; group moving link information 1108; moving link correlating information 1109; information 1110 of a mode for increasing the number of VLANs; and information 1111 on a target group of the mode for increasing the number of VLANS.

The physical adaptor identifier 1101 is an identification (ID) number (No.) added to a physical adaptor. The physical adaptor is a connecting portion to another information processing device of the port included in the switch. The VLAN link identifier 1102 is an ID No. that is assigned to the physical adaptor and indicates the VLAN to be linked. The group information 1103 of the redundant-configured virtual switch collects the physical adaptors and identifies the redundant-configured group. The UPLINK group information 1104 identifies the UPLINK group from among the redundant-configured virtual switches. The DOWNLINK group information 1105 identifies the DOWNLINK group from among the redundant-configured virtual switches. The link information 1106 indicates whether or not the link operation of the switching operation of the routes in the switching system is active. The link-group correlating information 1107 correlates, with each other, the groups for setting the switching operation of the link operation in the switching system to be active. The group moving link information 1108 indicates whether or not the correlated DOWNLINK group is shifted to another group upon causing a fault of the UPLINK group. The moving link correlating information 1109 correlates the groups for setting the link operation of the group movement with each other. According to the embodiment, the moving link correlating information 1109 relates only to the correlation within the DOWNLINK groups and the UPLINK groups. The information 1110 of the mode for increasing the number of VLANs indicates whether or not a function for increasing the number of VLANs is active. Herein, in the function for increasing the number of VLANs, the switching operation of the routes in the switching system is performed with the link operation, and even the VLAN assigned to the switch is switched. The information 1111 on the target group of the mode for increasing the number of VLANs correlates the groups for setting the function for increasing the number of VLANs to be active with each other.

Figure 12:
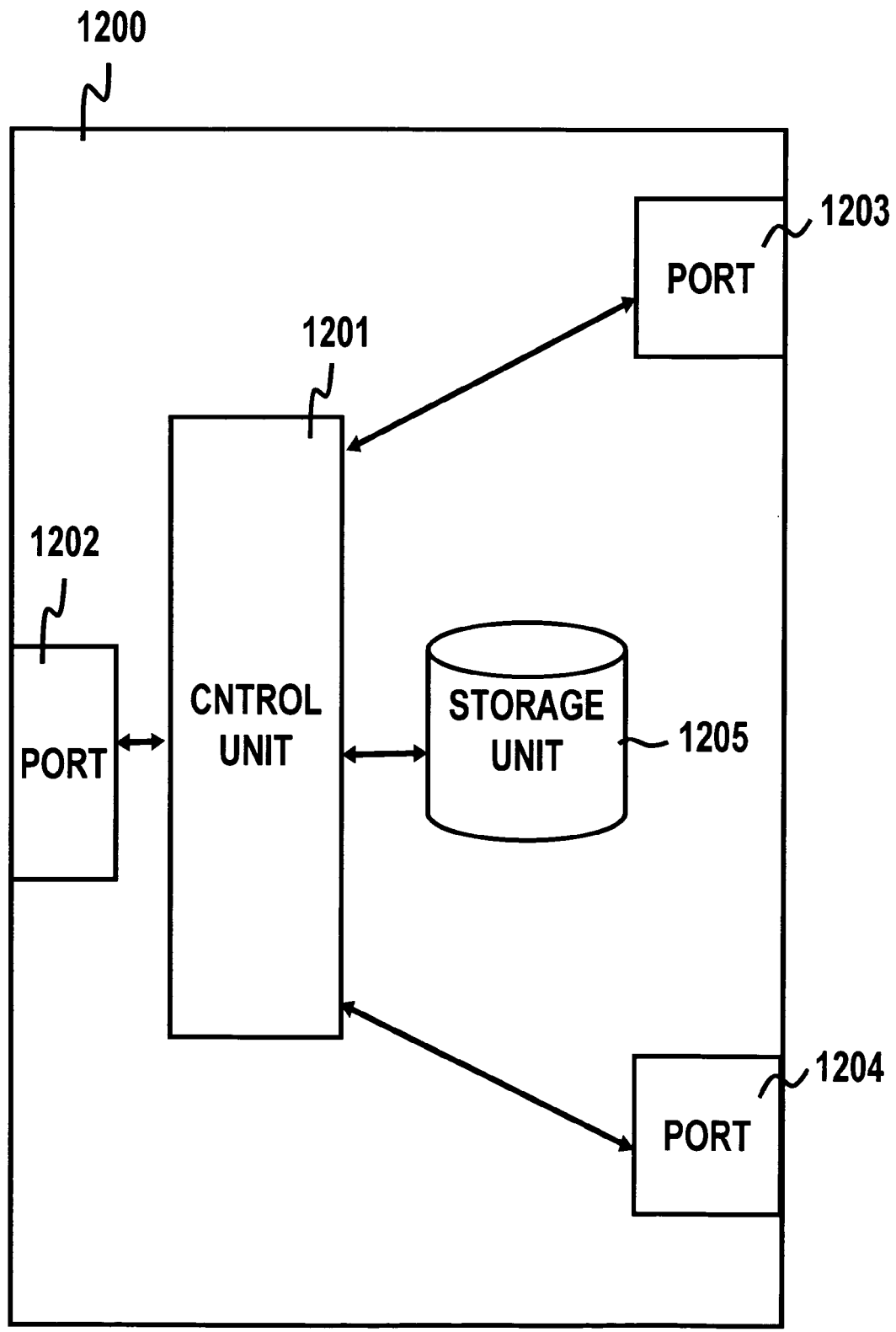
FIG. 12 is a block diagram showing the hardware of a switch according to the embodiment.

FIG. 12 is a block diagram showing the hardware of the switch 401 according to the embodiment.

The switch 401 comprises: a control unit 1201; ports 1202, 1203, and 1204; and a storage unit 1205.

The control unit 1201 comprises a CPU and a RAM, and variously controls the ports 1202, 1203, and 1204 and the storage unit 1205. The control operation is processed by executing an OS (Operating System) and a control program stored in the storage unit 1205. The control unit 1201 performs switching processing of a communication route by starting the OS stored in the storage unit 1205. Further, the OS performs processing for transmitting a packet received from the VLAN 418 to the switch 402.

The port 1202 is connected to the switch 402. Further, the port 1203 is connected to the VLAN 419 via the switch 405. The port 1204 is connected to the VLAN 418 via the switch 404. The control unit 1201 controls the operation for receiving the packet from the VLAN 418 via the port 1204 and transmitting the receiving packet to the switch 402 via the port 1202. Further, the control unit 1201 controls the operation for receiving the packet from the switch 402 via the port 1202 and transmitting the received packet to the VLAN 418 via the port 1204. The control unit 1201 controls the operation for setting the route 415 connected to the port 1203 to the Standby route and setting the route 415 in a hot standby mode, and preventing the reception and transmission of the packet from/to the port 1203.

Further, when a fault is caused in the port 1204 and the communication via the port 1204 is not possible, the control unit 1201 enables the communication via the port 1203. The control unit 1201 switches the VLAN 418 to the VLAN 419. In addition, the control unit 1201 transmits, to the switch 403 via the port 1202, link-down information indicating that the port 1204 is DOWN and a switching instruction of the link operation. The control unit of the switch 403 transmits, to the switch 401, a notification indicating that the route 417 is switched to the Standby route on the basis of the switching instruction of the link operation received from the switch 401. The control unit of the switch 403 switches the VLAN to be used from the VLAN 419 to the VLAN 418 and performs switching processing for switching the route 417 to the Standby route.

The storage unit 1205 stores a program and application for controlling the switch 401, such as the OS. Further, the storage unit 1205 stores a routing table, and the OS determines the transmitting destination of the packet received from the switch 401 by referring to the routing table and controls the transmission of the packet.

With the above operation, the switching system according to the embodiment exhibits the following advantages and effectively realizes the redundant configuration of the switch. The switching system according to the embodiment has: 1. the function for increasing the number of VLANs; 2. the function for removing the bias at the fault time; and 3. the function using the route for preventing the communication at a double fault.

In the switching system according to the embodiment, the Active-Active configuration using the VRRP enables the increase in the number of VLANs available by the switching system and in the number of authenticated users in proportion to the number of switches. Further, the consumption of a new bit field due to the increase in the number of VLANs is prevented.

In addition, in the switching system according to the embodiment, even if causing a line fault, a port fault, or a LAN fault, the communication is kept without reducing the number of VLANs used by the switching system.

In addition, in the switching system according to the embodiment, even if causing a port fault in the Active-Active configuration, the line using state can be equally kept without removing the bias in the switch used for communication. As a consequence, even at the time for causing the fault, the use of resources such as the CPU and the memory of the switch is effectively kept.

In addition, in the switching system according to the embodiment, since switching a plurality of the virtual switches having the redundant configuration with the link operation, the route of the virtual switch in which the fault is caused is retrieved to the virtual switch in which the fault is not caused and the switching system withstanding a double fault is realized.

Further, in the switching system according to the embodiment, the packet is transmitted and received by using the Active route in the virtual switch and the packet thus passes through the same route in outward and return and the time for receiving and transmitting the packet is reduced. As a consequence, a problem that SYN-ACK is deviated in the communication authentication and a program of the deviation of the packet permission in firewall are not caused.

According to the present invention, the processing executed by the detecting means is included in the processing performed the control unit 1201 according to the embodiment. Further, according to the present invention, the processing performed by the switching means is also included in the processing executed by the control unit 1201. In addition, according to the present invention, the notifying means is included in the processing executed by the control unit 1201.

Next, the technological spirits extracted from the switch according to the embodiment will be explained as appendixes in the description of Claims. The technological spirits according to the present invention can be grasped from the upper concept to the lower concept at various levels with variation thereof, and the present invention is not limited to the following appendixes.

What is claimed is:

1. A communication system, comprising:
    a first information processing device communicating with another information processing device via a network;
    a first communication line and a first backup line connected to the first information processing device, respectively;
    a second information processing device communicating with another information processing device via network;
    a second communication line and a second backup line connected to the second information processing device, respectively;
    a first switch
    connected to the first communication line
    and the second backup line and
    configured to switch the second backup line from standby to an active state when a communication failure via the first communication line is detected and to send a notification indicative of switching of the second backup line when the communication failure is detected; and a second switch connected to the first backup line and the second communication line and configured to switch from the second communication line to the first backup line upon receiving the notification from the first switch.

2. The communication system according to claim 1, wherein the first switch links the first communication line to the second backup line and links the first backup line to the second communication line.

3. The communication system according to claim 1, wherein the first switch switches a first Local Area Network (LAN) assigned to the first communication line.

4. The communication system according to claim 3, wherein the first switch switches the first LAN to a second LAN assigned to the second communication line.

5. The communication system according to claim 3, wherein the first switch links an uplink line connected to the first switch to a downlink connected to the first switch.

6. The communication system according to claim 1, wherein the first switch shuts down the first communication line in which the communication failure is caused.

7. The communication system according to claim 1, wherein the first backup line and the second backup line are in a hot standby state.

8. The communication system according to claim 4, wherein the first LAN and the second LAN are Virtual LANs (VLANs).

9. The communication system according to claim 1, wherein the first switch further monitors a communication state of the second switch periodically.

10. The communication system according to claim 1, further comprising:

a table containinq information indicative a group of communication line and a group of backup line;

wherein the first switch switches from the first communication line to the second backup line referrinq to the table.

11. The communication system according to claim 10, wherein the table includes a flag indicative of whether a line has been switched or not.

12. The communication system according to claim 11, wherein the table includes cooperation information indicative of cooperation of the switching the line.

13. The communication system according to claim 12, wherein the table includes a group link information.

14. The communication system according to claim 1, wherein the first switch links lines of uplink connected to the first switch and the second switch to lines of downlink connected to the first switch and the second switch.

15. The communication system according to claim 6, wherein the first switch shuts down the ports in a group included in the first communication line in which the communication failure is caused.

16. A switch for communicating a first information processing device and a second information processing device with network, the switch comprising:

a first port connected to a first communication line of the first information processing device;

a second port connected to a second backup line of the second information processing device; and a controller configured to switch from the first communication line to the second backup line when the controller detects a communication failure of the first port and to send a notification indicative of switching of the second backup line failure to another switch connected to the first information processing device via a first backup line and the second information processing device via a second communication line.

* * * * *

UNITED STATES PATENT AND TRADEMARK OFFICE
CERTIFICATE OF CORRECTION

| | | |
|---|---|---|
| PATENT NO. | : 7,848,226 B2 | Page 1 of 1 |
| APPLICATION NO. | : 12/078180 | |
| DATED | : December 7, 2010 | |
| INVENTOR(S) | : Satoshi Morita | |

It is certified that error appears in the above-identified patent and that said Letters Patent is hereby corrected as shown below:

In the Claims:

Column 16, Line 1 in Claim 10, delete "containinq" and insert -- containing --, therefor.

Column 16, Line 4 in Claim 10, delete "referrinq" and insert -- by referring --, therefor.

Signed and Sealed this
First Day of March, 2011

David J. Kappos
*Director of the United States Patent and Trademark Office*